United States Patent
Freytsis et al.

(10) Patent No.: US 7,423,965 B2
(45) Date of Patent: Sep. 9, 2008

(54) METHOD OF ADMISSION CONTROL FOR INELASTIC APPLICATIONS TRAFFIC ON COMMUNICATION NETWORKS

(75) Inventors: Ilya Freytsis, Swampscott, MA (US); Sean Moore, Hollis, NH (US)

(73) Assignee: Avaya Inc., Basking Ridge, NJ (US)

( * ) Notice: Subject to any disclaimer, the term of this patent is extended or adjusted under 35 U.S.C. 154(b) by 600 days.

(21) Appl. No.: 11/191,699

(22) Filed: Jul. 28, 2005

(65) Prior Publication Data

US 2007/0025248 A1 Feb. 1, 2007

(51) Int. Cl.
H04L 12/26 (2006.01)

(52) U.S. Cl. ..................... 370/229; 370/230

(58) Field of Classification Search ................ 370/229, 370/230, 231, 252, 235, 235.1, 238, 363, 370/368, 374, 378
See application file for complete search history.

(56) References Cited

U.S. PATENT DOCUMENTS 6,430,154 B1 * 8/2002 Hunt et al. ............... 370/230.1
7,251,216 B2 * 7/2007 Dube et al. ................ 370/232

OTHER PUBLICATIONS

Lima S et al., A Distributed Admission Control Model for Class-Based Networks Using Edge-to-Edge QOS and SLS Monitoring Communication Systems, 2002. ICCS 2002. The 8th International Conference on Nov. 25-28, 2002, Piscataway, NJ USA, IEEE, vol. 1, Nov. 25, 2002, pp. 122-127, XP010629194 ISBN: 0-7803-7510-6.
Mase K. et al. "QOS Management Vor VOIP Networks with Edge-to-Edge Admission Control" Globecom '01. 2001 IEEE Global Telecommunication Conference. San Antonio, TX, Nov. 25-29, 2001, IEEE Global Telecommunications Conference, New York, NY: IEEE, US, vol. 4 of 6 Nov. 25, 2001 pp. 2556-2560 XP001060603 ISBN: 0-7803-7206-9.
Mase K. et al., "An efficient end-to-end measurement based admission control for VOIP networks", Communications, 2004 IEEE International Conference on Paris, France Jun. 20-24, 2004. Piscataway, NJ USA, IEEE, Jun. 20, 2004 pp. 1877-1881, XP010710178 ISBN: 0-7803-8533-0.

* cited by examiner

Primary Examiner—Brenda Pham
(74) Attorney, Agent, or Firm—Cohen Pontani Lieberman & Pavane LLP

(57) ABSTRACT

A state-based admission control method for networks carrying inelastic applications traffic such as exemplary VoIP traffic. The method analyzes the history of real-time VoIP activities in a network to determine a corresponding control state and applies performance measurement techniques to form the admit/reject decisions for placed VoIP calls.

17 Claims, 2 Drawing Sheets

METHOD OF ADMISSION CONTROL FOR INELASTIC APPLICATIONS TRAFFIC ON COMMUNICATION NETWORKS

BACKGROUND OF THE INVENTION

1. Field of the Invention

The present invention relates to communication networks and, in particular, to methods of admission control for inelastic applications such as Voice-over-Internet-Protocol (VoIP)-based telephony that generate packet traffic on a packet-switched communication network using the Internet Protocol (IP).

2. Description of the Related Art

VoIP-based applications traffic, as well as traffic sourced by other real-time applications such as videoconferencing, are among the fastest growing segments of traffic on IP-based networks. Unlike many legacy data applications, these real-time applications are often inelastic in the sense that they have stringent bandwidth or throughput requirements and cannot tolerate excessive delays or packet losses that may occur when a packet-switched network is congested. Thus, it is important for an inelastic application to know at the time of session setup if a path or paths between the session endpoints provide a required level of performance with respect to throughput, delays, and packet losses. If the application determines that the path performance is sufficient, it will continue to setup, or admit, the session; otherwise, the application will reject the session setup request. The process of determining, at the session setup time, whether or not the network can support the application transport requirements and then deciding to admit or reject the setup request is commonly referred to as admission control.

Admission control in IP-based networks may be performed using measurement-based admission control (MBAC) methods. An MBAC method makes admit/reject decisions for new VoIP calls based on the results of measuring transport performance characteristics of the communication paths between the respective source and destination nodes in the network and refuses the admission when such measurements cross certain thresholds. In the MBAC method, the measurements may be collected either from actual VoIP sessions, a method called passive measurement, or from synthetic test traffic injected between pre-selected nodes of the network, a method called active measurement. The advantage of passive measurements is that no additional load is placed on the network; however, fresh passive measurements are often not available. The advantage of active measurements is that, with appropriate test scheduling, fresh performance measurements can always be available; however, active measurements consume capacity that would otherwise be available for actual sessions, thus reducing the utility of the network.

There are two methods for collecting active measurements: continual and on-demand. In a continual method, active traffic is transmitted across paths at a sufficiently high frequency such that fresh performance data is always available. In an on-demand method, at session setup time, a short burst of synthetic traffic is transmitted across a path between session endpoints. The advantage of a continual method is that a post-dial delay is minimized, at the cost of an additional network load. The disadvantage of the continual method is that it does not scale to large networks. In a typical wide-area network (WAN), a volume of synthetic test traffic necessary to make accurate performance data immediately available for any and all paths between endpoints is excessive and may consume most, if not all, of the network capacity. The advantage of an on-demand method is that it scales, while the disadvantage of this method is that it adds to the post-dial delay and may have poor accuracy. Accuracy of the on-demand method may be improved by extending the duration of the burst; however, such means may lead to exceeding budgets for the post-dial delay.

Therefore, there is a need in the art for an improved method for measurement-based admission control for VoIP traffic in IP-based networks that will simultaneously minimize the volume of active measurement traffic and the post-dial delays while ensuring that fresh performance measurement data is always available.

SUMMARY OF THE INVENTION

Various deficiencies of the prior art are addressed by the present invention of a state-based method for admission control of VoIP and other inelastic real-time traffic on an IP-based network. The inventive method minimizes volume of test traffic on the network and reduces post-dial delays for placed VoIP calls.

In one embodiment, to make the admit/reject decision for a placed VoIP call, the method configures specific passive, active-on-demand, and active-continual control states for performance measurements on the network. Each control state uses the history of VoIP activity on monitored paths to determine when control state change is required. Selection of the control states and transitions between the control states are governed by intensity of the VoIP traffic on the monitored communication paths. Each control state uses a predetermined technique for measuring the network's real-time performance.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

The teachings of the present invention will become apparent by considering the following detailed description in conjunction with the accompanying drawings, in which.

DETAILED DESCRIPTION OF THE PRESENTLY PREFERRED EMBODIMENTS

The present invention provides a state-based method for admission control in IP-based networks of inelastic applications traffic (e.g., VoIP traffic, videoconferencing traffic, multimedia traffic, circuit emulation traffic, and the like), as well as real-time applications traffic and traffic of applications using the Real-time Transport Protocol (RTP). Hereafter, such traffic is collectively referred to as VoIP traffic. In operation, the method simultaneously minimizes the test traffic in the network and reduces post-dial delay for placed VoIP calls by providing scalable and responsive admission control solutions.

Figure 1:
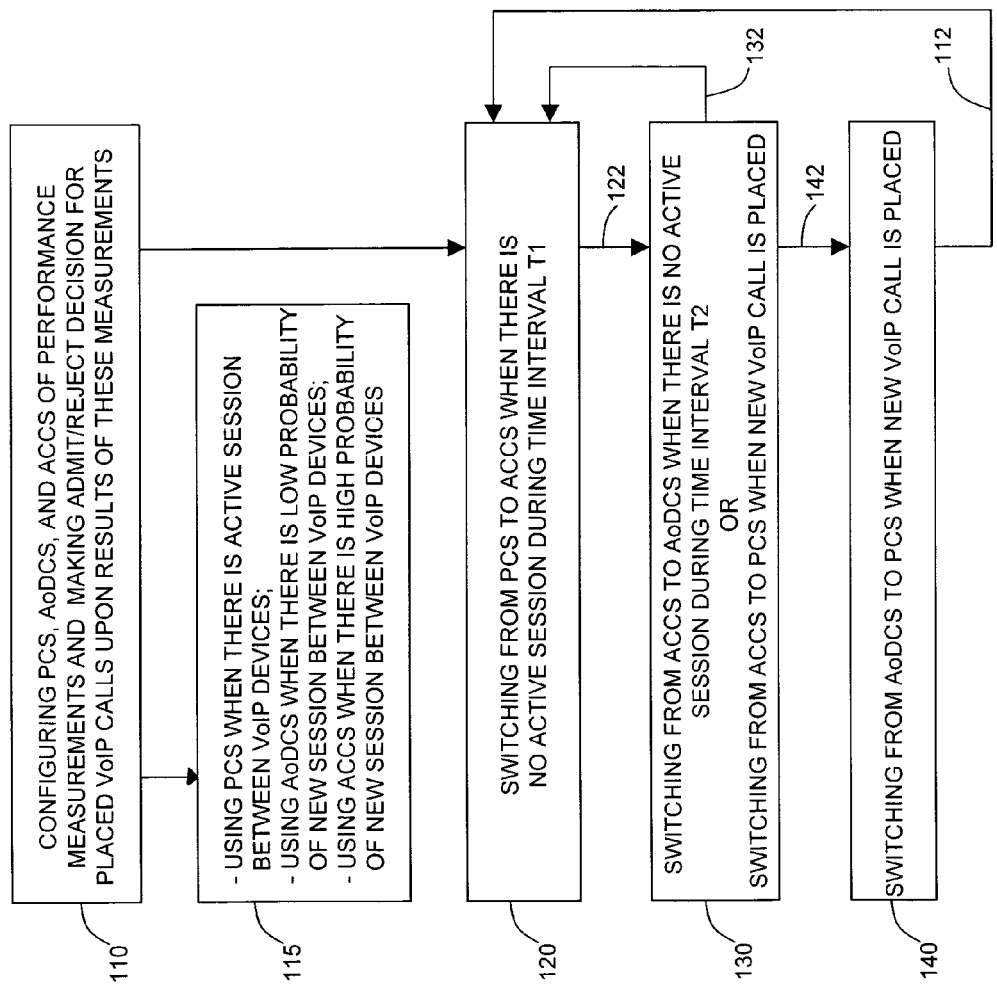
FIG. 1 depicts a flow diagram of a method of admission control for VoIP traffic on an IP-based network in accordance with one embodiment of the present invention.
Figure 2:
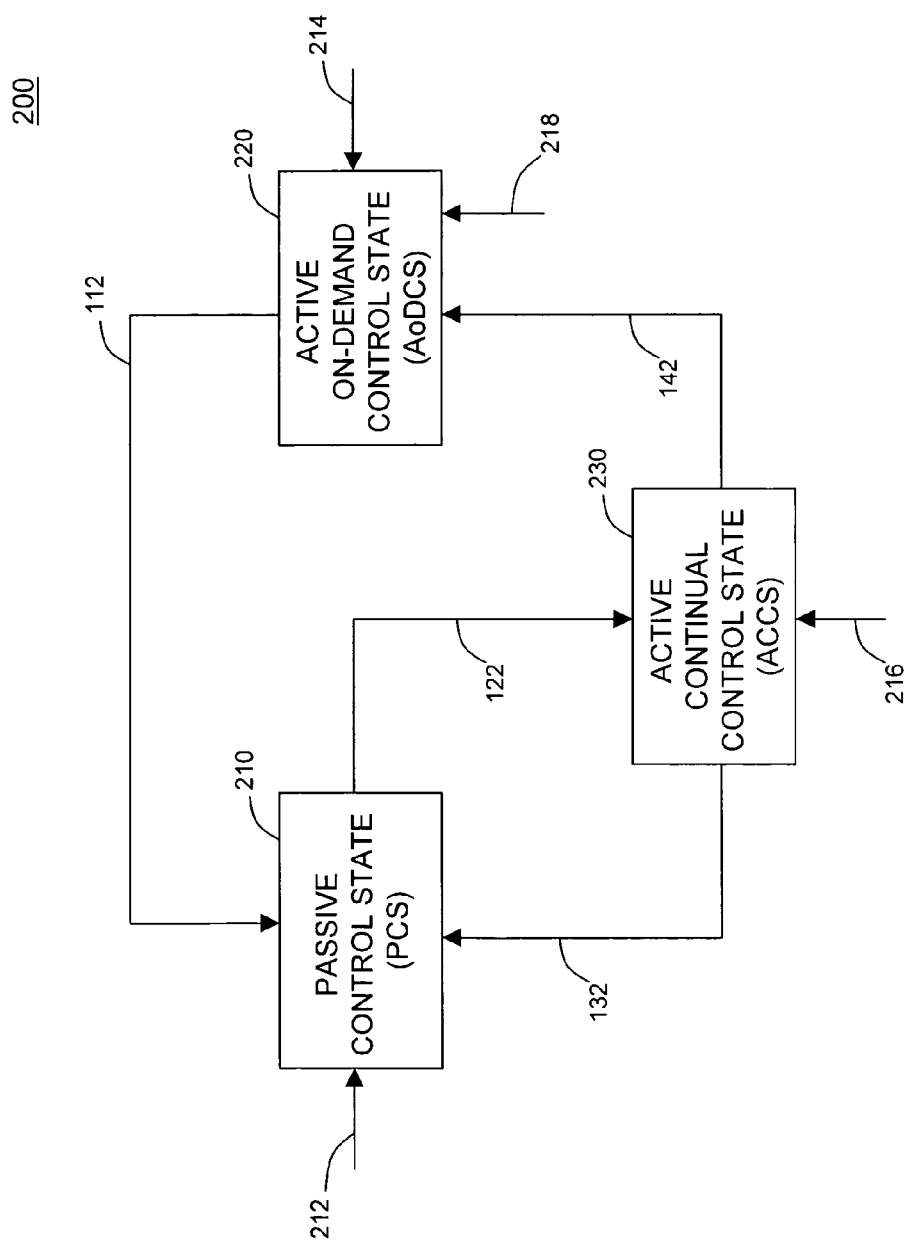
FIG. 2 depicts a high-level schematic diagram illustrating execution of the method of FIG. 1.

With reference to FIGS. 1 and 2, the method 100 includes processing steps performed for making an admit/reject decision for VoIP calls placed within an exemplary cell of a network (i.e., on a communication path between arbitrarily selected source and destination nodes of the network). In operation, the method 100 may by applied to a network-wide plurality of communication paths between nodes of the network. The method 100 starts at step 110 where specific individual control states are defined and configured on an IP-based network (not shown) using a state-based admission control (SBAC) method of the present invention. In one embodiment, such specific admission control states include a passive control state (PCS) 210, an active-on-demand control state (AoDCS) 220, and an active-continual control state (ACCS) 230.

Typically, the method 100 is implemented in the form of a computer program, or software, which is a portion of a management system (not shown) of the IP-based network. When activated, the program executes the method 100.

Admit/reject decisions for placed VoIP calls (such calls are illustratively shown in FIG. 2 using arrows 212, 214, and 216) are made based on the results of active (AoDCS 220, ACCS 230) or passive (PCS 210) measurements performed in each of the respective control states.

In one embodiment, when the VoIP call is placed during a transition from one control state to another (e.g., transitions PCS-to-ACCS, ACCS-to-AoDCS, etc.), such admit/reject decisions are made using the results of the measurements performed in the control state from which the transition was originated, thus reducing post-dial delays for these VoIP calls. However, in an alternate embodiment, the decisions may be made in the control state when the transition ends.

In the method 100, transitions between the control states are governed by configurable time intervals, or time-outs, T1 and T2 (discussed in detail in reference to steps 120 and 130 below). The time intervals T1 and T2 may be either pre-set or automatically tuned to facilitate, during the respective control state, execution of a flexible and adaptive decision-making process.

In one embodiment, measured performance attributes include link bandwidth, the outputs of standard interface queries, path delays, packet loss probabilities, jitter parameters, a list of recent rejections, a list of problematic calls (typically, indicative of transient problems on the network or a need to adjust the SBAC settings), a list of infrastructure problems, and weighted error probability.

Generally, admit and reject decisions are made based upon comparison of the results of these measurements against a plurality of pre-determined thresholds for performance properties of the network. For each measured property, the thresholds may either be absolute or relative, as well as be a function of other performance properties or topology of the network. Alternatively, for a portion of performance metrics, the method 100 may occasionally utilize statistical and/or historic values to estimate the network's performance.

A typical IP-based network includes multiple communication links (e.g., individual interconnect segments or grouped/aggregated interconnect segments (subnets)) that provide connectivity to the VoIP-based devices. In operation, the performance metrics in the control states of the method 100 may vary depending on topology of the network and paths to VoIP-based devices (e.g., endpoints, media servers, media gateways, test endpoints, etc.).

To make the admit/reject decision for a placed VoIP call, the performance measurements should be performed and the results analyzed for all communication links interconnecting the respective source and destination nodes. In the method 100, data collected for interconnect segments and subnets that are common to other communication paths of the network, may be utilized for making the admit/reject decisions regarding the VoIP calls placed between nodes of such common paths. A network-wide SBAC state may be represented in a form of a matrix N×N, where N is a number of interconnect segments and each cell of the matrix holds the control state for specific destination/source pair of the network's nodes.

Referring to box 115, selection of the control state, as well as transitions between the control states, are governed by a level of intensity of the real-time VoIP traffic on the respective paths of the network. In operation, the method 100 exploits the history of the VoIP application activity between the destination/source pairs of the nodes to select either a passive measurement technique (in PCS 210) or an active measurement technique (in AoDCS 220 and ACCS 230) for monitoring network performance and making the admit/reject decisions for VoIP calls placed on the corresponding segments.

The PCS 210 is selected when there is an active application session between the VoIP-based devices (or their proxies) on the respective path(s) and no active network performance testing is required. As such, in PCS 210, no test traffic is injected into the network. However, the actual VoIP traffic is continually monitored and the performance data for making the admit/reject decision for the placed VoIP call 212 is readily available to the method 100. In one embodiment, the performance data is available in a format compatible with the Real-time Control Protocol (RTCP).

The AoDCS 220 is selected when, based on the history of the VoIP activity on the respective path(s), there is low probability of a new VoIP session between the corresponding VoIP-based devices. To reduce volume of the test traffic on the network, no active testing of network performance is conducted in this control state. However, such testing may be triggered by the incoming VoIP call 214 or the Call Admission Request (CAR) command (illustratively shown in FIG. 2 using an arrow 218), thus trading reduction in the test traffic for respectively increased post-dial delay for incoming VoIP calls.

The ACCS 230 is selected when, based on the recent history of VoIP activity on the respective path(s), there is high probability of a new VoIP session between the corresponding VoIP-based devices occurring in the near future. In this control state, active testing of network performance is continually performed on the affected segments using synthetic test traffic. Analysis of the collected data produces information to the admit/reject decision process for the placed (or anticipated) VoIP calls 216 and minimizes the post-dial delays for these calls.

Transitions between the control states (illustratively shown in FIG. 1 using links 112, 122, 132, and 142) are performed based on a combination of the history of VoIP activities on the monitored segments and the real-time VoIP traffic on the same segments. Arbitrarily, in FIG. 1, an initial control state is shown as PCS 210.

At step 120, the PCS 210 is maintained while there is available passive measurement data, i.e., while there is an actual call traversing the associated path. In this control state, the method 100 passively monitors the network performance data during the existing, or active, VoIP sessions and makes the admit/reject decisions for the placed (i.e., new) VoIP calls 212. After the last actual call terminates, if no new VoIP call 212 is placed for a duration of time since the last call termination that is longer than T1, the PCS 210 switches to the ACCS 220 (link 122).

At step 130, the ACCS 220 is maintained during a second predetermined time interval T2. In this control state, the method 100 uses the synthetic test traffic injected between the respective test endpoints of the network to measure the network's real-time performance and make the admit/reject decisions regarding the new VoIP calls. The measurements are performed in the background and do not interfere with the real-time VoIP traffic. After a new VoIP call 216 is placed, the ACCS 220 makes the admit/reject decisions for that call and then switches to the PCS 210 (link 132). If no new VoIP call is placed for a duration of time that is longer than T2, the ACCS 220 switches to the AoDCS 230 (link 142).

At step 140, the AoDCS 230 is maintained until a new VoIP call 214 is placed or the CAR command 218 has been received. When the new VoIP call 214 is placed, the AoDCS 230 makes the admit/reject decision for that call (by performing active measurements), and then switches to the PCS 210 (link 112). Correspondingly, in response to the CAR command 218, the method 100 uses the synthetic test traffic injected between the respective test endpoints to measure the real-time performance of the network. Based on the results of such measurements, the AoDCS 230 may either be extended in time or switched to the PCS 210. In both cases, the measurements are performed in the background and do not interfere with the real-time VoIP traffic.

In operation, sequential transitions between the control states of the method 100 are repetitively executed in an order discussed above in reference to steps 120, 130, and 140.

Thus, while there have been shown and described and pointed out fundamental novel features of the present invention as applied to preferred embodiments thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of admission control for inelastic applications traffic (IAT) in a communication network, comprising:
   (a) configuring a passive control state (PCS), an active on-demand control state (AoDCS), and an active continual control state (ACCS) for performance measurements in the network;
   (b) executing the PCS when there is an active session between IAT-based devices on monitored interconnect segments of the network;
   (c) executing the AoDCS when there is low probability of a new session between the IAT-based devices;
   (d) executing the ACCS when there is high probability of a new session between the IAT-based devices;
   (e) switching from the PCS to ACCS when there is no active session during a first pre-determined time interval T1;
   (f) switching from the ACCS to AoDCS when there no active session during a second pre-determined time interval T2;
   (g) switching from the ACCS to PCS when an IAT call is placed; and
   (h) switching from the AoDCS to PCS when an IAT call is placed;
   wherein admit and reject decisions for placed IAT calls are made based on the results of the performance measurements performed during the respective control state.

2. The method of claim 1 wherein the IAT is selected from the group consisting of Voice over Internet Protocol (VoIP) traffic, videoconferencing traffic, multimedia traffic, circuit simulation traffic, real-time applications traffic, and traffic of applications using the Real-time Transport Protocol (RTP).

3. The method of claim 1 wherein the duration of each of the time intervals T1 and T2 is an independently selectable parameter.

4. The method of claim 1 wherein the communication network is a network using the Internet Protocol (IP).

5. The method of claim 1 wherein the performance measurements are performed in the background and do not interfere with the IAT traffic.

6. The method of claim 1 wherein the performance measurements during the AoDCS and the ACCS use synthetic test traffic injected between test endpoints of the network.

7. The method of claim 6 wherein during the ACCS the performance measurements are performed continually.

8. The method of claim 6 wherein during the AoDCS execution of the performance measurements may be triggered by a placed IAT call and the Call Admission Request (CAR) command.

9. The method of claim 1 wherein the performance measurements performed during the PCS comprise passive monitoring of the IAT traffic.

10. The method of claim 1 wherein the performance measurements are performed on at least one interconnect segment and at least one group of interconnect segments.

11. The method of claim 1 wherein the performance measurements are performed on paths between the subnet nodes and on paths between the source/destination nodes and the respective subnet nodes.

12. The method of claim 11 wherein the performance measurements on paths between the source and destination nodes and the respective subnet nodes are performed in the AoDCS and the ACCS.

13. The method of claim 1 wherein the admit and reject decisions for the placed IAT call are made upon comparison of the results of said performance measurements against pre-determined thresholds for performance properties of the network.

14. The method of claim 13 wherein the pre-determined thresholds are selected from the group consisting of absolute thresholds and relative thresholds.

15. The method of claim 13 wherein the performance properties comprise at least one of link bandwidth, interface queries, path delays, packet loss probabilities, jitter parameters, a list of recent rejections, a list of problematic calls, a list of infrastructure problems, and weighted error probability.

16. The method of claim 1 wherein the admit and reject decisions for the IAT call placed during a transition between the control states are made using the results of the performance measurements performed in the control state from which the transition was originated.

17. The method of claim 1 wherein the admit and reject decisions for the IAT call placed during a transition between the control states are made using the results of the performance measurements performed in the control state where the transition ends.

* * * * *